United States Patent
Wollenburg

(10) Patent No.: US 11,642,809 B2
(45) Date of Patent: May 9, 2023

(54) TRACK SQUARE WITH ADJUSTABLE MECHANISM

(71) Applicant: Woodpeckers, LLC, Strongsville, OH (US)

(72) Inventor: Benjamin T. Wollenburg, Amherst, OH (US)

(73) Assignee: WOODPECKERS, LLC, Strongsville, OH (US)

( * ) Notice: Subject to any disclaimer, the term of this patent is extended or adjusted under 35 U.S.C. 154(b) by 20 days.

(21) Appl. No.: 16/827,769

(22) Filed: Mar. 24, 2020

(65) Prior Publication Data
US 2021/0299905 A1   Sep. 30, 2021

(51) Int. Cl.
*B27B 27/10*   (2006.01)
*B27B 27/02*   (2006.01)

(52) U.S. Cl.
CPC .............. *B27B 27/10* (2013.01); *B27B 27/02* (2013.01)

(58) Field of Classification Search
CPC ......... B27B 27/00; B27B 27/02; B27B 27/04; B27B 27/06; B27B 27/08; B27B 27/10; Y10T 83/74–747; B23D 59/007
USPC ....................... 83/438, 446, 447, 468.3, 574, 83/435.12–435.14
See application file for complete search history.

(56) References Cited

U.S. PATENT DOCUMENTS

| | | | | |
|---|---|---|---|---|
| 1,331,415 A | * | 2/1920 | Civitts | 33/471 |
| 2,876,808 A | * | 3/1959 | Ottar | B23Q 9/0085 269/291 |
| 2,895,515 A | * | 7/1959 | Ende | B27B 25/10 83/435.13 |
| 2,903,026 A | * | 9/1959 | Frydenlund | B23Q 9/0085 83/468.3 |
| 2,942,633 A | * | 6/1960 | King | B23Q 17/2233 83/486.1 |
| 3,454,056 A | * | 7/1969 | Pahlck | B23Q 9/0014 83/483 |
| 3,645,307 A | * | 2/1972 | Stocker | B23Q 9/0085 30/376 |
| 4,202,233 A | * | 5/1980 | Larson | B23Q 9/0014 30/372 |

(Continued)

OTHER PUBLICATIONS

Insta-Railsquare and Insta-Railsquare XL sold by the Tool Nut. https://www.toolnut.com/catalogsearch/result/index/?manufacturer=Generic&q=insta-railsquare.

(Continued)

*Primary Examiner* — Adam J Eiseman
*Assistant Examiner* — Richard D Crosby, Jr.
(74) *Attorney, Agent, or Firm* — Sand, Sebolt & Wernow Co., LPA

(57) ABSTRACT

A track square and a method of use thereof. The track square is adjustable to change an angle at which a guide rail is engaged therewith. A user is able to make a cut with a track saw that is oriented at right angles to the edge of the wood but is also able to make cuts at angles of less than ninety degrees relative thereto. The guide rail is secured to a rotatable turntable on the track square by an engagement mechanism. The turntable is rotated to the desired angle utilizing an angle setting mechanism and is then locked at the selected angle by a locking mechanism. The engaged guide rail and track square are positioned on the piece of wood to be cut and the track saw is moved along the guide rail to cut the wood at the set angle.

11 Claims, 13 Drawing Sheets

(56) References Cited

U.S. PATENT DOCUMENTS

| | | | | |
|---|---|---|---|---|
| 4,335,512 | A * | 6/1982 | Sheps | B23Q 9/005 30/376 |
| 4,441,394 | A * | 4/1984 | Barsotti | B23D 47/025 83/409 |
| 4,608,761 | A * | 9/1986 | Small | B23Q 9/0092 30/376 |
| 4,751,865 | A * | 6/1988 | Buckalew | B23Q 9/0014 83/486.1 |
| 4,800,793 | A * | 1/1989 | McCord, Sr. | B27B 5/207 83/468.3 |
| 4,901,444 | A * | 2/1990 | Maschmeier | B25H 1/0078 33/426 |
| 4,934,233 | A * | 6/1990 | Brundage | B23D 45/044 83/397 |
| 4,945,799 | A * | 8/1990 | Knetzer | B23Q 9/005 83/486.1 |
| 5,042,346 | A * | 8/1991 | McCann | B27B 25/10 83/421 |
| 5,063,805 | A * | 11/1991 | Brundage | B23D 45/044 83/468.3 |
| 5,259,286 | A * | 11/1993 | Chen | B27G 5/02 83/468.3 |
| 5,271,159 | A * | 12/1993 | Chen | B27G 5/02 33/456 |
| 5,283,958 | A * | 2/1994 | Chang | B27B 25/10 33/538 |
| 5,379,670 | A * | 1/1995 | Ferry | B27B 27/06 83/468 |
| 5,388,338 | A * | 2/1995 | Majors | E04F 21/241 33/376 |
| 5,402,701 | A * | 4/1995 | Ingram | B27B 25/10 269/304 |
| 5,566,603 | A * | 10/1996 | Moeres | B27B 27/06 83/468.3 |
| 5,603,164 | A * | 2/1997 | Haddix | G01B 5/24 83/522.18 |
| 5,735,054 | A * | 4/1998 | Cole | B27B 25/10 83/437.1 |
| 5,845,410 | A * | 12/1998 | Boker | B27B 27/08 33/536 |
| 5,855,366 | A * | 1/1999 | Chang | B27B 27/08 269/315 |
| 6,079,309 | A * | 6/2000 | Molburg | B23Q 9/0078 83/745 |
| 6,141,882 | A * | 11/2000 | Syken | B43L 7/12 33/465 |
| 6,189,429 | B1 * | 2/2001 | Liu | B23D 47/025 108/143 |
| 6,298,573 | B1 * | 10/2001 | Segal | B23Q 3/183 33/642 |
| 6,502,492 | B1 * | 1/2003 | Krohmer | B27B 25/10 33/471 |
| 6,557,601 | B1 * | 5/2003 | Taylor | B27B 27/02 144/253.1 |
| 6,672,190 | B2 * | 1/2004 | Taylor | B27B 25/10 33/469 |
| 6,691,423 | B2 * | 2/2004 | Fontaine | B23Q 16/06 33/471 |
| 6,708,422 | B1 * | 3/2004 | Stojanovski | B23Q 9/005 33/640 |
| 6,725,558 | B2 * | 4/2004 | Gommper | B23Q 9/0042 33/640 |
| 6,763,751 | B2 * | 7/2004 | Judge | B23D 45/024 83/468.1 |
| 6,880,442 | B2 * | 4/2005 | Duginske | B27B 27/08 144/253.1 |
| 7,051,634 | B1 * | 5/2006 | Chubb | B27B 5/201 83/522.18 |
| 7,373,732 | B2 * | 5/2008 | Baida | B27B 9/04 33/640 |
| 7,523,562 | B2 * | 4/2009 | Sargeant | B23Q 9/0085 33/640 |
| 8,220,374 | B2 * | 7/2012 | Wang | B27B 27/10 83/435.15 |
| 8,359,961 | B2 * | 1/2013 | Barnes | B27B 9/04 83/745 |
| 8,555,762 | B1 * | 10/2013 | Jones | B23Q 16/001 83/522.16 |
| D718,355 | S * | 11/2014 | Muramatsu | D15/138 |
| 9,649,776 | B2 * | 5/2017 | Appling | B27B 9/04 |
| 9,751,139 | B2 * | 9/2017 | Groth | B27B 9/04 |
| 10,363,681 | B2 * | 7/2019 | Friedebach | B27B 9/04 |
| 10,843,368 | B2 * | 11/2020 | Friedebach | B27B 9/04 |
| 10,875,109 | B1 * | 12/2020 | Gibson | B27B 27/02 |
| 10,882,123 | B2 * | 1/2021 | Brewster | B23D 47/02 |
| 11,020,872 | B2 * | 6/2021 | Dutterer | B27B 27/08 |
| 2002/0096029 | A1 * | 7/2002 | Petersen | B27B 27/08 83/468.3 |
| 2003/0233922 | A1 * | 12/2003 | Makropoulos | B23Q 9/0042 83/574 |
| 2005/0061128 | A1 * | 3/2005 | Caughlin | B23Q 9/0042 83/745 |
| 2005/0145082 | A1 * | 7/2005 | Moe | B27G 5/02 83/468.3 |
| 2005/0178260 | A1 * | 8/2005 | Bokelaar | B23D 47/025 83/486.1 |
| 2005/0204887 | A1 * | 9/2005 | Fries | B23Q 9/005 83/13 |
| 2007/0084323 | A1 * | 4/2007 | Parks | B27B 25/10 83/468.3 |
| 2007/0251370 | A1 * | 11/2007 | Hsieh | B23Q 9/0042 30/388 |
| 2008/0009961 | A1 * | 1/2008 | Dick | B27B 27/02 700/167 |
| 2011/0265625 | A1 * | 11/2011 | Lawlor | B23Q 17/2404 83/520 |
| 2014/0013912 | A1 * | 1/2014 | Chen | B23D 45/048 83/471.3 |
| 2014/0026725 | A1 * | 1/2014 | Makropoulos | B27B 9/04 83/13 |
| 2016/0075051 | A1 * | 3/2016 | Firth | B27B 5/187 83/452 |
| 2021/0046596 | A1 * | 2/2021 | Dick | B27B 27/10 |

OTHER PUBLICATIONS

GRS-16 and GRS-16 PE guide rail squares sold by TSO Products. https://tsoproducts.com/tso-guide-rail-squares/grs-16-grs-16-pe-guide-rail-combo-set/.

* cited by examiner

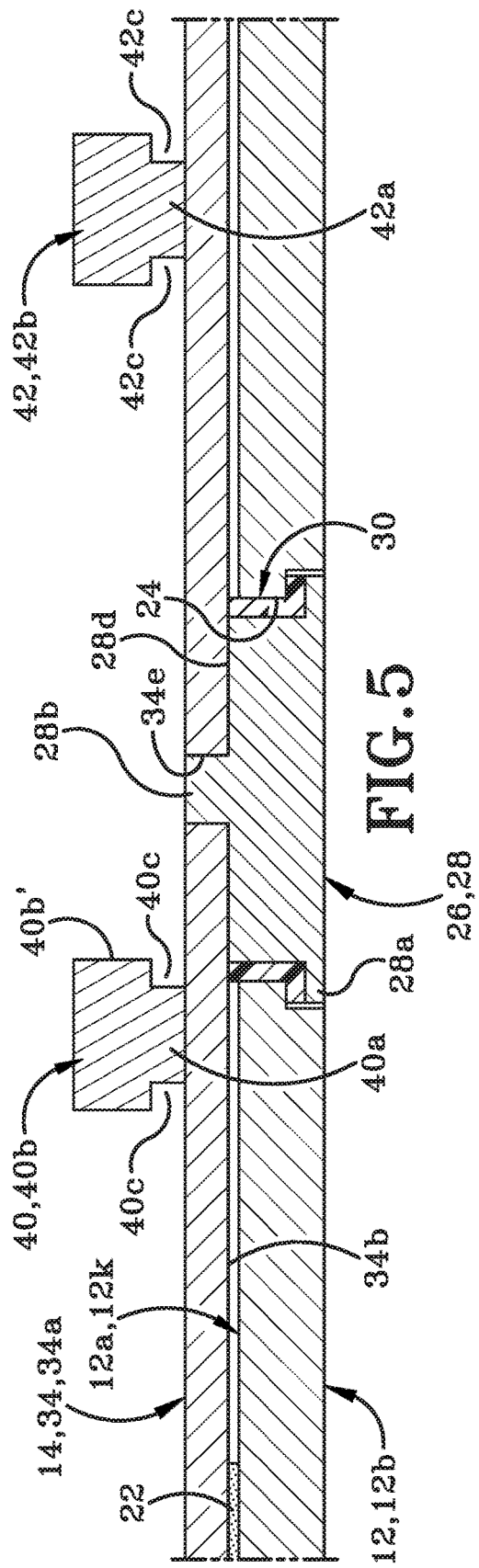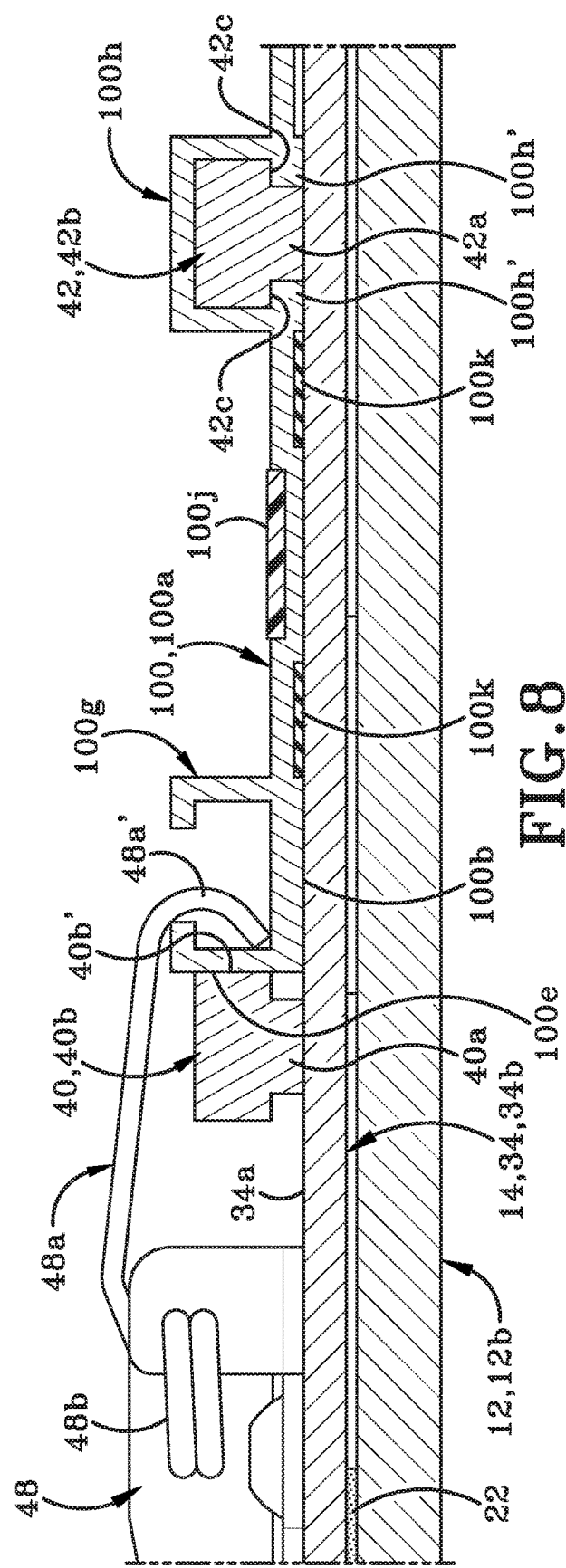

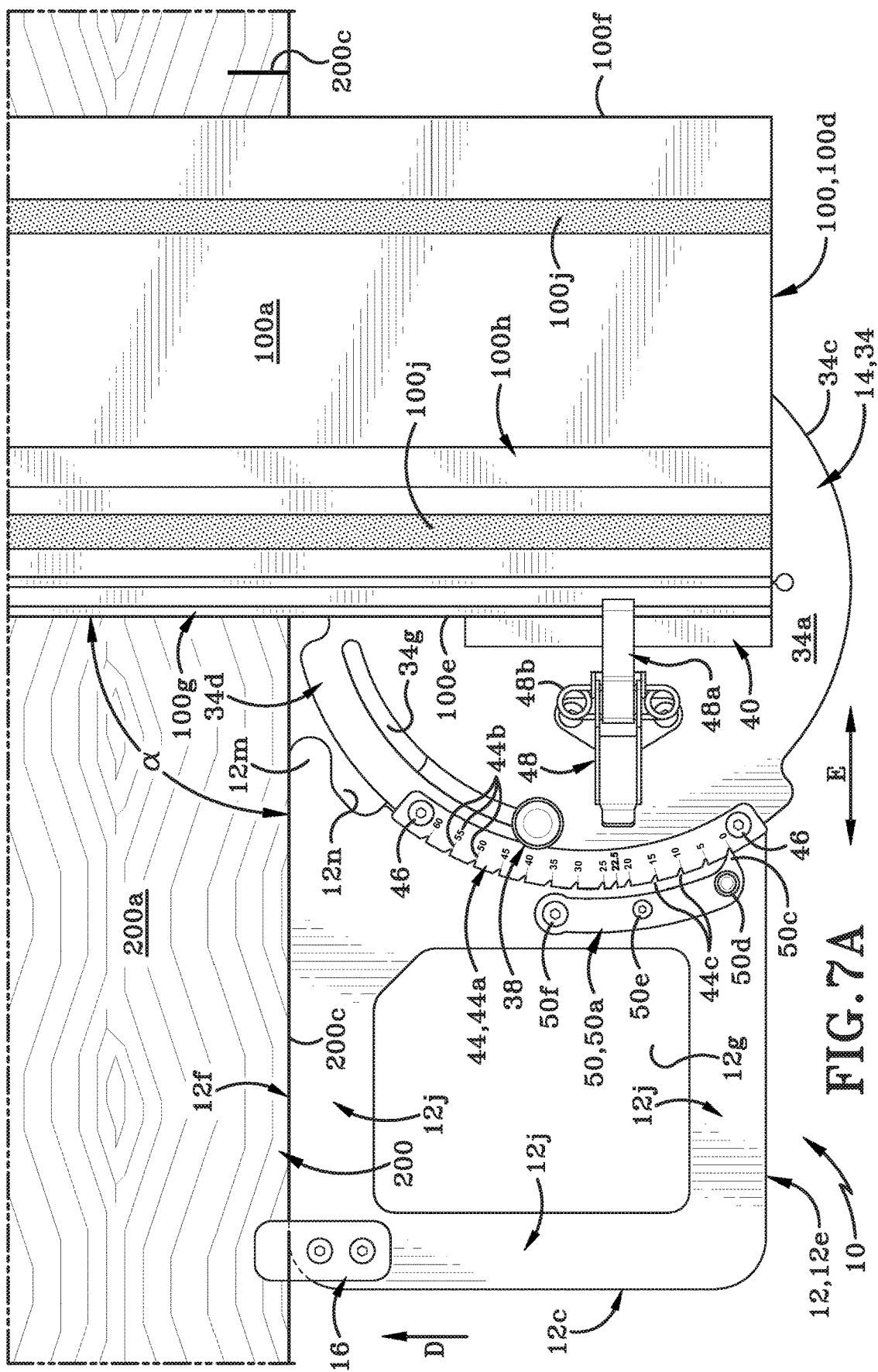

TRACK SQUARE WITH ADJUSTABLE MECHANISM

TECHNICAL FIELD

This disclosure is directed generally to woodworking tools. In particular, this disclosure is directed to a track square used to orient a guide rail of a track saw relative to a piece of wood to be cut. Specifically, the track square is an adjustable track square that enables a user to select an angle at which to orient the guide rail relative to the wood to be cut, and the angle is selectively variable by rotating a turntable on the track square with which the guide rail is engaged.

BACKGROUND

Background Information

There are a variety of different types of motorized saw that may be used to cut beams, planks, and sheets of wood in different ways, and for different purposes. Each type of saw is used in a different setting to ensure that the operator of the saw cuts the type of wood safely and efficiently. Circular saws, for example, are handheld tools that are useful for cutting sheets of wood and can be used to make full-length sheet cuts. One of the downsides of circular saws is that they require the user to measure and mark a line on a sheet of wood along which they wish to cut. Using the circular saw to cut along the line must done freehand and, as a result, the cuts made with circular saws may not be particularly straight or particularly accurate.

Table saws are useful for repetitively cross-cutting or ripping wood pieces into smaller strips that are of a predictable width. The user is able to preset the width of a cut by moving a fence on the table towards or away from a position of the blade and then locking the fence in that selected position. The user will then place an edge of the wood to be cut against a first part of the fence and will either feed the wood toward the blade or move the blade relative to the wood. If a different width end piece is desired, the fence is moved to a new position relative to the blade and is then locked into position. While table saws are useful for making predictable cuts, if they are used to cut full sheets of wood, they are typically not particularly portable and the wood has to be brought to the saw. Table saws that are portable and can be moved easily to a job site are often not useful for cutting full sheets of wood stock.

A more portable saw that is capable of being move readily to any job site but is capable of repeatedly making long, precise cuts is a track saw. Track saws also can be used in relatively tight spaces. Track saws include a guide rail that is laid on top of a piece of wood to be cut. The track saw is locked into the guide rail such that saw's blade is located adjacent a side edge of the guide rail. The saw is actuated and advanced along the guide rail to make a cut in the wood. Typically, the guide rail is not clamped onto the piece of wood to be cut but is, instead, frictionally retained on the upper surface of the wood by rubber strips provided on the underside of the guide rail.

When using a track saw, the user may make one mark or two spaced apart marks on the upper surface of the wood and then line the edge of the guide rail with those marks. In order to cut accurately, it is also helpful to ensure the guide rail is square to the edge of the wood. This can be accomplished by placing a framing square or other suitable square on the edge of the wood and aligning the guide rail with that square. The problem with this is that it requires one hand to hold the square and the other hand to position the guide rail and operate the saw.

In order to address this problem, a number of manufacturers have developed guide rail squares that are able to be engaged with one or more brands of guide rail that are used with track saws. Typically, these guide rail squares are slidably engaged with the guide rail and then a front surface of the guide rail is placed against the wood stock to be cut, the track saw is engaged with the guide rail and is used to cut the wood stock. The resultant cut is square to the edge of the wood stock along which the front of the guide rail square was placed. One guide rail square that performs in this manner is the GRS-16 guide rail square and the GRS-16 PE guide rail square sold by TSO Products of Fort Myers, Fla., USA. Another similar guide rail square is the Insta-Railsquare and Insta-Railsquare XL sold by The Toolnut of Yorktown Heights of New York, USA. The Insta-Railsquare has a triangular-shaped end that may be rotated to bring the hypotenuse of the triangle into contact with the wood stock to be cut. Placing this edge of the guide rail square against the wood stock with the guide rail engaged therewith, allows the user to make a 45° cut in the wood stock.

SUMMARY

While the above-referenced guide rail squares are adequate for squaring wood stock, i.e., making right angled-cuts therein or, in some instances, for making 45° cuts, these devices are incapable of additionally making cuts at other angles.

The guide rail square of the present disclosure is able to be used with a track saw to make right angled cuts but is also capable of being used to cut angles other than ninety degrees. In particular, the trade square of the present disclosure is able to be set at an angle of 0° to make a cut oriented at right angles to the edge of a piece of wood. The device of the present disclosure is also able to be set at an angle of other than 0° to make cuts of less than ninety degrees relative to the edge of the piece of wood. In particular, the user is able to set the angle of the turntable at any angle of from about 0° up to about 60°.

The device of the present disclosure is a track square that is able to be interlockingly engaged with a guide rail of a track saw. The guide rail is placed on an upper surface of a piece of wood to be cut and the track square is placed against an edge of wood. The guide rail is then automatically held square to the edge of the wood. When the track saw is engaged with the guide rail and is actuated, the track saw will make a cut that is square to the edge of the wood.

The device of the present disclosure is furthermore an adjustable track square that is able to be set to position and hold the guide rail of a track saw at an angle other than ninety degrees relative to the edge of the piece of wood to be cut. For example, the track square may be set to retain the guide rail at ninety degrees to the edge of the wood to be cut. In other instances, the track square may be set to retain the guide rail at an angle other than ninety degrees relative to the edge of the wood to be cut. For example, the track square may be adjusted to retain the guide rail at an angle of 20° or 30° or 45° or 60° relative to the edge of the wood. In particular, the track square may be adjusted to orient the guide rail at an angle of from 30° up to about 90° relative to the edge of the wood to be cut.

In one aspect, an exemplary embodiment of the present disclosure may provide an adjustable track square comprising a base having a front adapted to abut an edge of a piece of wood to be cut; a turntable rotatably engaged with the base; and an engagement mechanism provided on the turntable, said engagement mechanism being adapted to interlockingly engage with a guide rail of a track saw; and wherein the turntable is configured to selectively rotate to present the guide rail at an angle relative to the edge of the piece of wood.

In another aspect, an exemplary embodiment of the present disclosure may provide a method of cutting a piece of wood comprising engaging a track square with a guide rail of a track saw; selecting an angle at which to orient the guide rail relative to the track square; moving the guide rail into the selected angle orientation; placing a front of the track square in contact with a vertical edge of a piece of wood to be cut with the track saw; placing a lower surface of the guide rail in contact with an upper surface of the piece of wood; moving the track saw along the guide rail; and cutting the wood with the track saw at the selected angle.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 5 is a cross section of the adjustable track square taken along line 5-5 of FIG. 4;

FIG. 7A is a top plan view of the track square engaged with the guide rail and positioned adjacent an edge of a piece of wood to be cut;

FIG. 8 is a cross-section of the adjustable track square and guide rail taken along line 8-8 of FIG. 7;

Similar numbers refer to similar parts throughout the drawings.

DETAILED DESCRIPTION

Referring to FIGS. 1-12 there is shown an adjustable track square in accordance with the present disclosure, generally indicated at 10. The adjustable track square discussed hereafter will be referred to as "track square 10" for simplicity of explanation.

Figure 2:
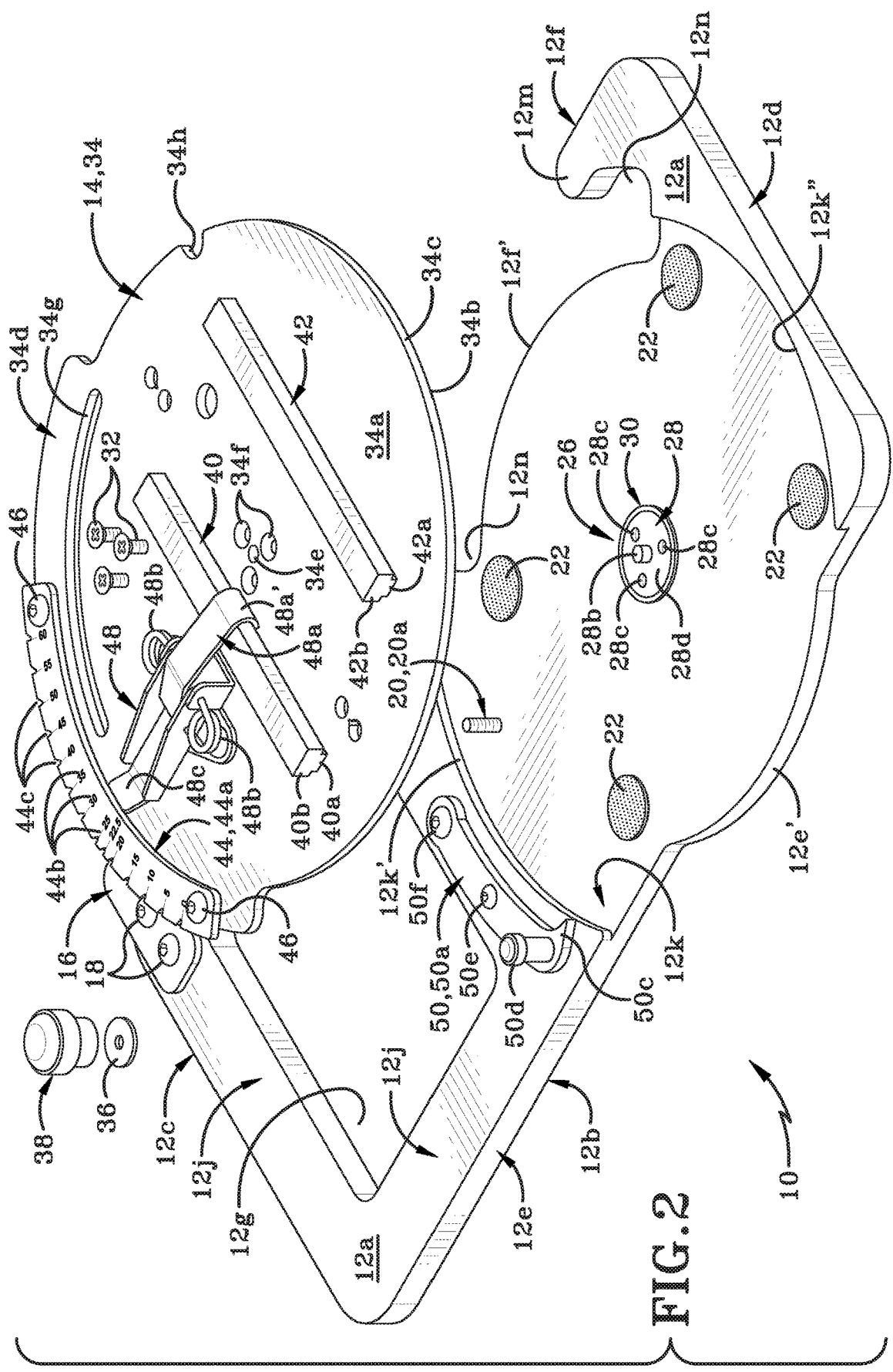
FIG. 2 is a partially exploded, top, front, left side perspective view of the adjustable track square of FIG. 1.

As seen best in FIG. 2, track square 10 comprises a base 12 and a turntable 14 that are engaged with each other in such a way that turntable 14 is able to rotate relative to base 12.

Base 12 is generally rectangular in shape when viewed from above and includes an upper surface 12a, a lower surface 12b (FIG. 5), a first end 12c, a second end 12d, a back 12e, and a front 12f. Upper and lower surfaces 12a, 12b are opposed and define a vertical direction therebetween. First and second ends 12c, 12d are opposed and define a longitudinal direction therebetween. Back 12e and front 12f are opposed and define a lateral direction therebetween.

FIG. 2 shows that base 12 defines an aperture 12g therein that extends between upper surface 12a and lower surface 12b. Aperture 12g may be generally square or rectangular in shape. As illustrated, a 45° corner region 12h is provided such that aperture 12g is not entirely square or rectangular in shape. Corner region 12h may be provided simply for decorative or aesthetic reasons. A strip 12j of base 12 circumscribes the aperture 12g. Strip 12j may be about one inch wide between the associated first end 12c and aperture 12g, between back 12e and aperture 12g, and between front 12f and aperture 12g. Aperture 12g is sized so as to be able to receive at least a portion of a person's hand therethrough and will act as a handle when track square 10 is manipulated. The strip 12j may be gripped in the person's hand and in this way, strip 12j acts as a handle that aids a person in holding and manipulating track square 10.

FIG. 2 further shows that base 12 defines a recessed region 12k in upper surface 12a. Recessed region 12k is shaped and sized to receive turntable 14 therein. In particular, recessed region 12k is bounded and defined by a first arcuate edge 12k' that is separated from aperture 12g by strip 12j. Recessed region 12k is further bounded and defined by a second arcuate edge 12k'' that is separated from second end 12d by a narrow piece of upper section 12a. Edges 12k' and 12k'' are concave in shape and are complementary in curvature to a circumferential outer edge of turntable 14, as will be later described herein. Between edges 12k' and 12k'', recessed region 12k includes two curved edge sections 12e' and 12f' that, with edges 12k' and 12k'', give recessed region a generally circular appearance when viewed from above. Edge section 12e' extends outwardly for a distance beyond the rest of back 12e. The rest of back 12e is generally straight. Edge section 12f is recessed relative to the rest of front 12f. The recessing of edge section 12f forms two finger regions 12m that are separated from edge section 12f' by notches 12n.

Figure 3:
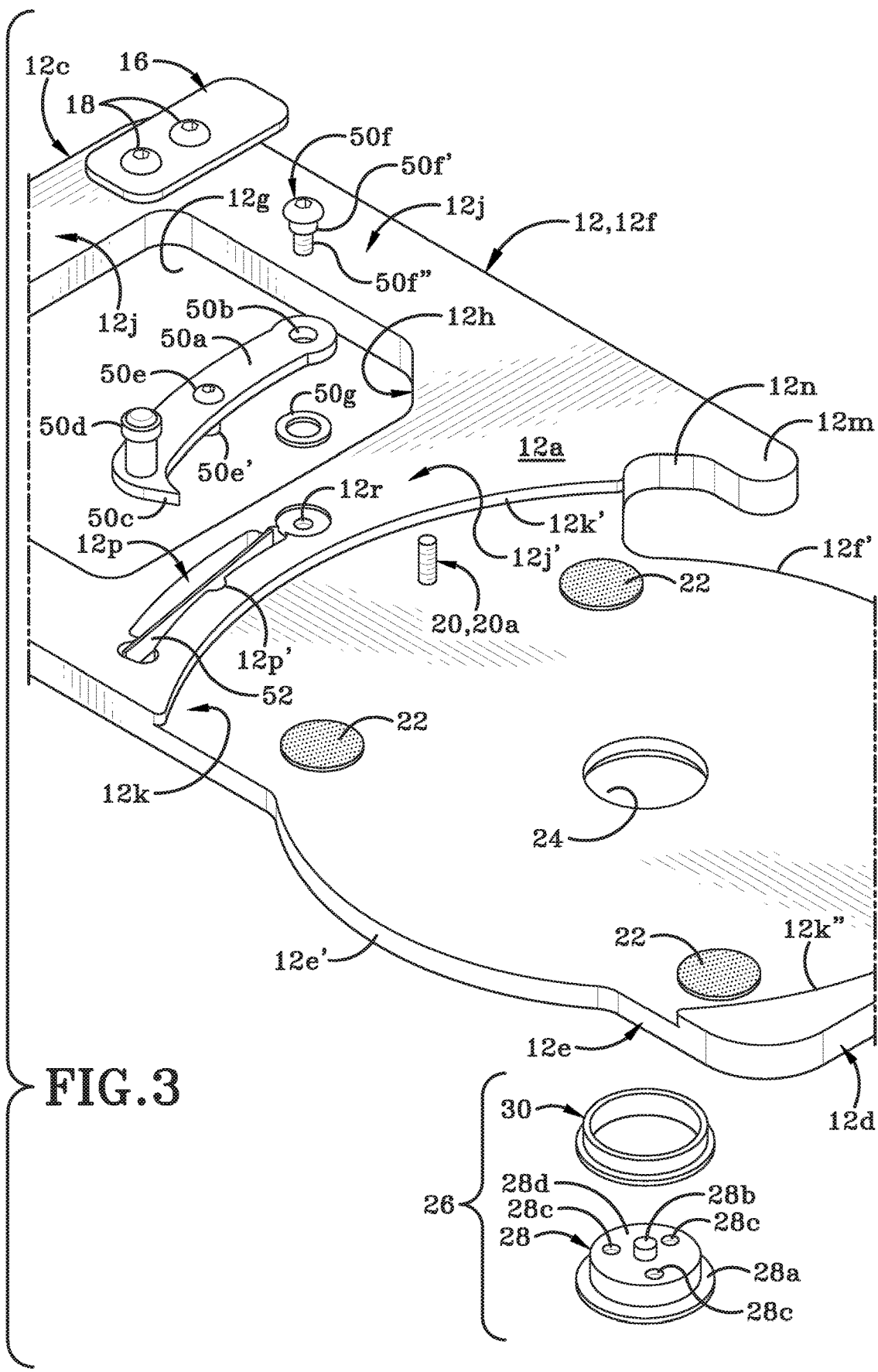
FIG. 3 is a partial exploded, top, front, left side perspective view of the base of the adjustable track square.

Referring to FIG. 3, base 12 defines a slot 12p in upper surface 12a. Slot 12p is located in a portion 12j' of strip 12j that is located between aperture 12g and edge 12k'. Slot 12p originates a short distance inwardly from back 12e and extends laterally towards front 12f but terminates before a midway point between back 12e and front 12f. An indentation 12p' (FIG. 3) is defined in strip 12j' along one edge of slot 12p. A countersunk threaded hole 12r is located proximate the termination of slot 12p. The purpose of slot 12p and hole 12r will be discussed later herein.

Figure 1:
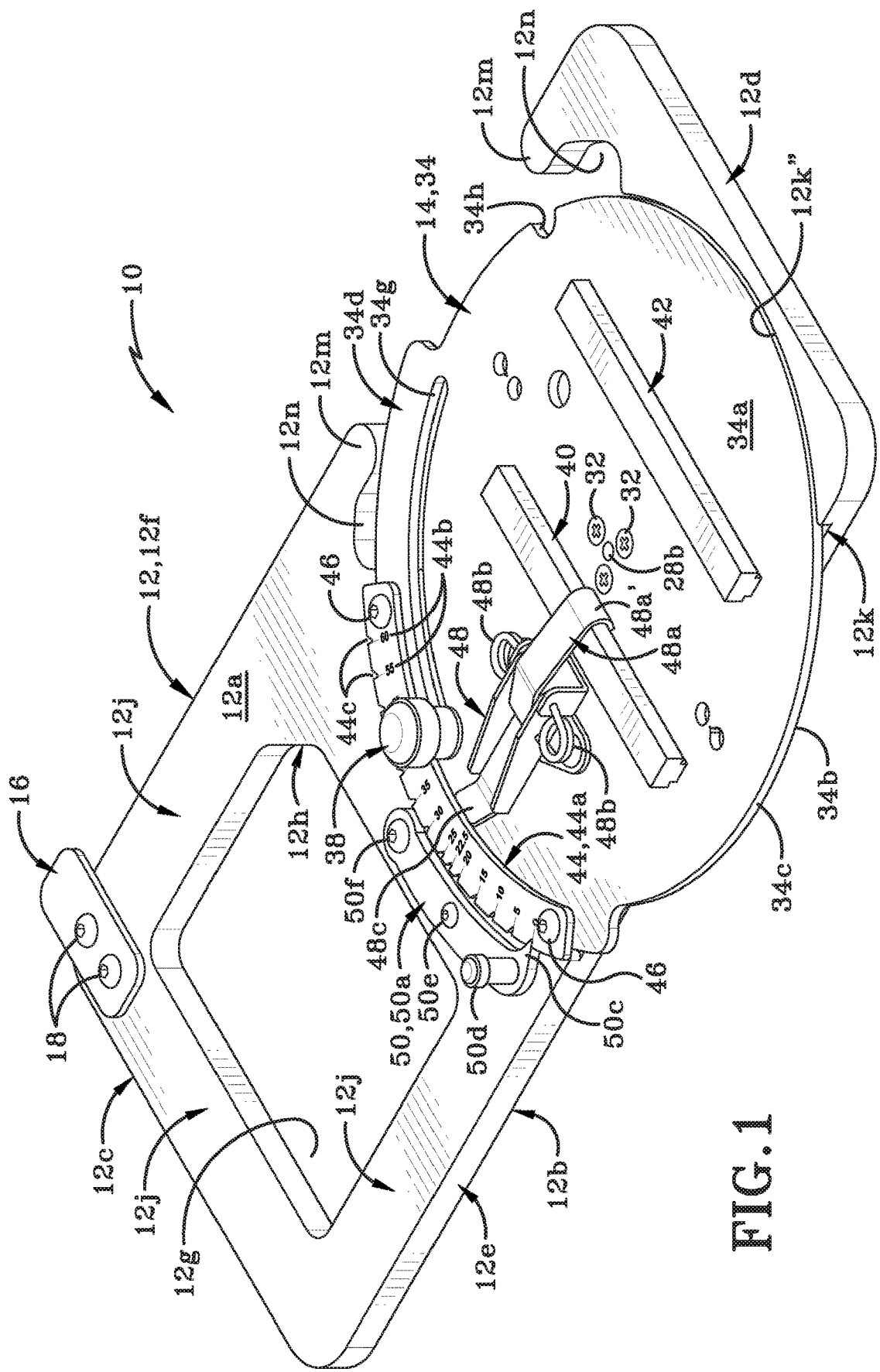
FIG. 1 is a top, front, left side perspective view of an adjustable track square in accordance with an aspect of the present disclosure.

Referring to FIG. 1, a support tab 16 is secured to upper surface 12a of base 12 by fasteners 18. As illustrated herein support tab 16 is a generally rectangular, planar tab that is secured to upper surface 12a in such a way that the tab 16 extends for a distance outwardly beyond front 12f of base 12. The purpose of support tab 16 will be described later herein.

FIG. 2 shows that a post 20 extends vertically upwardly from the upper surface of base 12 in recessed region 12k. Post 20 is threaded with threads 20a. Post 20 is positioned a distance away from edge 20k' and is positioned generally midway between back 12e and front 12f. The purpose of post 20 will be described later herein.

Referring still to FIG. 2, a plurality of friction-reducing pads 22 are provided at intervals on the upper surface of the recessed region 12k of base 12. Pads 22 are located so that they will contact turntable 14 and allow turntable 14 to move relative to base 12, as will be described later herein.

A hole 24 (FIGS. 3 and 5) is defined in base 12 in recessed region 12k. Hole 24 extends between the upper surface of the recessed region 12k and lower surface 12b of base. A hub assembly 26 is seated within hole 24. Hub assembly 26 comprises a body 28 and an annular ring 30. Body 28 includes a flange 28a that is flush with lower surface 12b of base 12 when hub assembly 26 is engaged in hole 24. Flange 28a extends radially outwardly for a distance between the rest of the body 28 and creates a shoulder upon which annular ring 30 is seated when annular ring is engaged with body 28. This is best seen in FIG. 5. Body 28 includes a central post 28b that extends upwardly from an upper surface of the body 28. Body 28 also defines a plurality of threaded holes 28c (FIG. 3) in an upper surface thereof. Holes 28c circumscribe central post 28b. As illustrated, three holes 28c are defined in the upper surface of body 28.

As best seen in FIG. 5, when hub assembly 26 is engaged in aperture 24, a portion of the body and the friction-reducing material of ring 30 extends upwardly for a distance beyond the upper surface of the recessed region 12k. Hub assembly 26 is utilized to secure turntable 14 to base 12. In particular, turntable 14 sits on the upper surface 28d of body 28, on the upper edge of ring 30, and on pads 22 (FIG. 3). A plurality of fasteners 32 (FIG. 2) are utilized to secure turntable 14 to hub assembly 26 and thereby to base 12. This will be described later herein.

Referring to FIG. 2, turntable 14 comprises a plate 34 that is generally circularly shaped and is generally complementary in shape and size to be received with recessed region 12k of base 12. Plate 34 has an upper surface 34a, a lower surface 34b (FIG. 5) and has a circumferential edge 34c. As shown in FIG. 2, plate 34 is not completely circular in shape but instead includes an arcuate region 34d that extends outwardly for a distance beyond the diameter of the rest of the circumferential edge as measured from a central hole 34e. Central hole 34e extends between upper surface 34a and lower surface 34b and is located so as to receive central post 28b of hub assembly 26 therethrough when turntable 14 is engaged with base 12. Central hole 34e is circumscribed with a plurality of apertures 34f that are complementary in number and location to holes 28c defined in hub assembly 26. When central post 28b is received through central hole 34e, apertures 34f are able to be aligned with holes 28c and fasteners 32 are threaded engaged with the threaded holes 28c.

Track square 10 includes a locking mechanism that is movable between a locked condition and an unlocked condition. When the locking mechanism is in the locked condition, the turntable 14 is not able to rotate relative to the base 12. When the locking mechanism is in the unlocked condition, the turntable 14 is able to rotate relative to the base 12. Any one of a number of different locking mechanisms may be utilized to selectively lock turntable 14 against rotational motion. As illustrated in the attached figures, the locking mechanism provided on track square 10 includes an arcuate slot 34g and a locking knob 38 having a shaft that extends through slot 34g. As will be described herein, locking knob 38 is rotated in a first direction about the shaft and into a locked condition and is rotated about the shaft in a second direction to an unlocked condition. The locking action of the locking mechanism and the various components thereof will be described below.

Slot 34g is a convexly curved slot defined in plate 34. Slot 34g is defined in arcuate region 34d of plate 34 and extends between upper surface 34a and lower surface 34b. Slot 34g is arcuate and, in particular, has a substantially similar radius of curvature to the portion of circumferential edge 34c that is provided on arcuate region 34d. Slot 34g is positioned such that when turntable 14 is engaged with base 12 as described above, the post 20 extends upwardly through slot 34g. A washer 36 (FIG. 2) and internally threaded knob 38 are engaged with post 20. When knob 38 is rotated in a first direction to a sufficient degree, turntable 14 is able to rotate relative to base 12. When knob 38 is rotated in the opposite direction to a sufficient degree, turntable 14 is locked in position relative to base 12 and is unable to rotate relative thereto. The purpose for the locking or unlocking of turntable 14 for movement relative to base 12 will be discussed later herein.

A notch 34h is defined in the circumferential edge 34c of plate 34. Notch 34h is defined a spaced distance circumferentially from one end of arcuate region 34d. The purpose of notch 34h will be described later herein.

Track square 10 is provided with an engagement mechanism that is adapted to interlockingly engage track square 10 with a guide rail 100 (FIG. 6) of a track saw. The engagement mechanism may comprise one or more components that are provided on track square 10 to enable interlocking engagement between track square 10 and guide rail 100. The engagement mechanism includes one or more guide bars that engage guide rail 100. In particular, track square 10 is provided with a first guide bar 40 and a second guide bar 42 that are provided on upper surface 34a of plate 34 of turntable 14. As will be describe later herein, a portion of guide rail 100 will abut first guide bar 40 and a portion of guide rail 100 will interlock with second guide bar 42.

Figure 4:
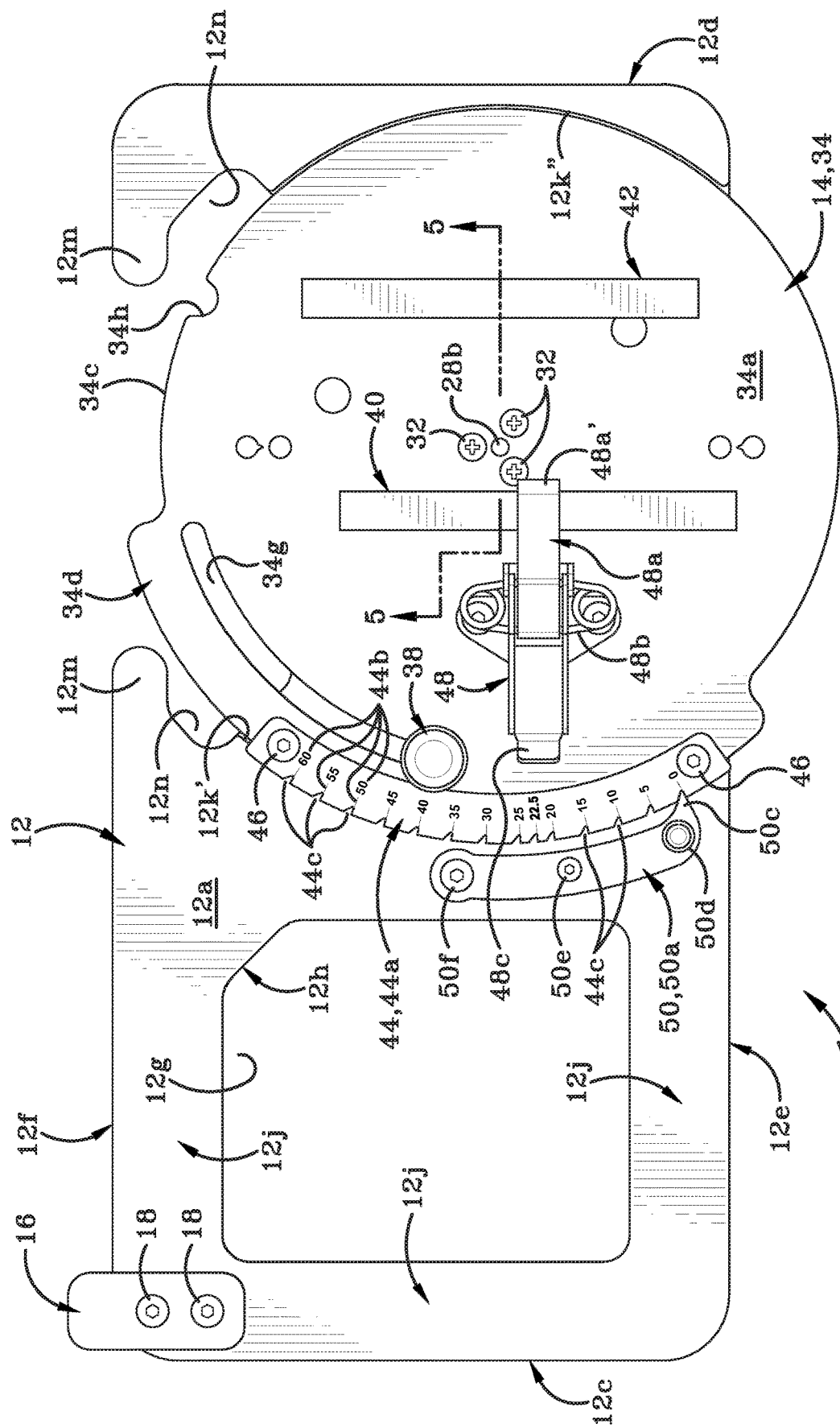
FIG. 4 is a top plan view of the adjustable track square.

First guide bar 40 and second guide bar 42 are oriented generally parallel to each other and are located on opposed sides of central hole 34e defined in plate 34. First guide bar 40 and second guide bar 42 are also oriented somewhat parallel to a central section of arcuate region 34d as is best seen in FIG. 4. First and second guide bars 40, 42 are illustrated as not originating and terminating at the same locations but it will be understood that the ends of the two guide bars 40, 42 may be aligned with each other in other embodiments.

As best seen in FIG. 5, each of the first guide bar 40 and second guide bar 42 is generally T-shaped in cross-section. First guide bar 40 includes a vertical first leg 40a and a horizontal second leg 40b. Similarly, second guide bar 42 includes a vertical first leg 42a and a horizontal second leg 42b. As illustrated, the first and second guide bars 40, 42 are substantially identical in cross-section and the horizontal second legs 40b, 42b are located at a same distance vertically away from upper surface 34a of plate 34. Grooves 40c and 42c are defined between second legs 40, 42, respectively and upper surface 34a. The specific purpose and use of first and second guide bars 40, 42 will be discussed later herein.

Track saw 10 is also provided with an angle selection mechanism that is operable to orient the guide rail 100 at a selective angle relative to the base 12 and thereby to ensure that the guide rail 100 will be presented at a desired angle relative to a piece of wood to be cut by the track saw that moves along the guide rail 100. The angle selection mechanism as illustrated herein includes a scale 44 that is engaged with plate 34. In particular, scale 44 is a planar member 44a that is engaged with arcuate region 34d of plate 34 by way of fasteners 46. Planar member 44a of scale 44 is illustrated as being substantially similar in curvature to arcuate region 34d and is secured to arcuate region 34d in such a way that a portion of the planar member 44a extends radially outwardly beyond the circumferential edge 34c of plate 34. Planar member 44a is provided with a plurality of graduated markings 44b (FIG. 4) thereon that represent angles. The graduated markings 44b, as illustrated, start at "0°" and terminate at "60°", increasing generally by five degrees. Some additional graduations are provided to indicate less than five degrees. For example, an additional graduated marking 44b is provided half-way between 20° and 25° to indicate 22.5°. It will be understood that the represented graduated markings 44b are by way of example only and any suitable and desired set of graduated markings 44b may be provided on scale 44. Scale 44 also includes a plurality of V-shaped notches 44c that are formed on the outermost edge of scale 44 that extends outwardly beyond the circumferential edge 34c of plate 34. Each of the V-shaped notches 44c aligns with one of the graduated markings 44b. The purpose of scale 44 will be described later herein.

As indicated earlier herein, track square 10 is provided with an engagement mechanism that is adapted to interlockingly engage track square 10 with a guide rail 100 (FIG. 6) of a track saw. Another component of the engagement mechanism is a spring-loaded draw latch 48 that is mounted on upper surface 34a of plate 34 of turntable 14. The draw latch 48 engages with an upper surface 100a of the guide rail 100 while the first guide bar 40 and second guide bar 42 described earlier herein engage with a lower surface 100b of the guide rail 100. The engagement mechanism therefore securely retains both the upper and lower surfaces 100a, 100b of the guide rail 100 in engagement with the track square 10.

The draw latch 48 is located intermediate scale 44 and first guide bar 40. Draw latch 48 is also able to interlockingly engage guide rail 100. Draw latch 48 includes a pivotally mounted lever arm 48a which extends outwardly toward first guide bar 40 and has a hooked end 48a' (FIG. 8). Lever arm 48a includes one or more springs 48b and a tab 48c at an end remote the hooked end 48a'. When it is desired to lock a guide rail of a track saw to track square 10, the lever arm 48a is pivoted about an axis that is parallel to first guide bar 40. In particular, lever arm 48a is pivoted to caused hooked end 48a' thereof to latch onto guide rail. When hooked end 48a' is engaged with the guide rail, the tab 48c is pushed in a direction moving toward scale 44 and away from first guide bar 40. Tab 48c is pushed downwardly to cause draw latch to lock in place. Springs 48b ensure tension is maintained on hooked end 48a' so as to keep track square 10 and the guide rail secured to each other. In order to later release draw latch 48 from its engagement with the guide rail, the tab 48c is lifted upwardly away from upper surface 34a and is pushed toward first guide bar 40. This motion releases the engagement of the hooked end 48a' of the draw latch 48 from the guide rail and the engagement between track square 10 and the guide rail is therefore broken.

The angle selection mechanism provided on track square 10 further comprises a stop lever 50 that is mounted on base 12 in a position where the stop lever 50 is capable to interact with scale 44 on turntable 14. The stop lever 50 and scale 44 together set the rotational position of the turntable 14 relative to the base 12. As shown in FIG. 3, lever arm 50 comprises a plate member 50a that defines an aperture 50b proximate a first end thereof. The aperture 50b extends between an upper surface and a lower surface of the plate member 50a. Plate member 50a is provided with a hook 50c at a second end thereof that is opposite the first end. The hook 50c extends laterally outwardly from one side of the plate member 50a and is substantially V-shaped. In particular, the apex of the V-shaped hook 50a is configured to be complementary to the V-shaped notches 44c defined in scale 44. When the hook 50c is engaged in a particular V-shaped notch 44c, the guide rail 100 engaged with the track square 10 will be held at a particular angle relative to front 12f of track square 10. For example, if hook 50c is engaged with the V-shaped notch 44c adjacent the marking 44b of "0°" (FIG. 7A), then the guide bar 42 is oriented at right angles to front 12f of base 12 and therefore the guide rail 100 that is engaged with guide bar 42 will be held at right angles to front 12f. If, on the other hand the hook 50c is engaged in the V-shaped notch 44c adjacent the marking 44b of "30°", then the guide bar 42 rotates through 30° from the ninety degree position to 60° relative to front 12f of base and therefore the guide rail 100 will be oriented at 60° relative to front 12f. If the hook 50c is engaged in the V-shaped notch 44c adjacent the marking 44b of 60°, then the guide bar 42 will have moved through 60° from the ninety degree position shown in FIG. 7A and the guide bar 42 and thereby the guide rail 100 will be retained at an angle of 30° relative to front face 12f of track square 10.

It will be understood that hook 50c does not need to latch into one of the V-shaped notches 44c in scale 44 in order to set the angle between the guide bar 42 and the front 12f. Instead, the hook 50c can be positioned between any two adjacent markings 44b on scale 44 and thereby between two V-shaped notches 44c, and still function in the manner described above.

A gripping knob 50d extends upwardly from the upper surface of plate member 50a proximate the second end and the hook 50c. A shaft 50e' of a first fastener 50e extends through an aperture (not numbered) defined in plate member 50a and outwardly for a distance beyond a lower surface of plate member 50a. A second fastener 50f and washer 50g are utilized to secure plate member 50a to base 12. In particular, washer 50g is seated within the countersunk region of the threaded hole 12r. The shaft of second fastener 50f includes a smooth section 50f' proximate the head of the fastener and a threaded portion 50f'' remote from the head. The shaft extends through hole 50b, through the opening in washer 50g and into threaded hole 50b. The smooth section 50f' of the shaft of second fastener 50f is seated within the hole 50b of plate member 50a of stop lever 50 and the threaded section 50*f'* is threadedly engaged in the hole 12*r* defined in base 12. Second fastener 50*f* is therefore fixedly engaged with base 12 and plate member 50*a* is capable of pivoting about an axis that extends along the shaft of second fastener 50*f*, as will be described later herein.

As best seen in FIG. 3, a leaf spring 52 is seated within slot 12*p* defined in base 12. When plate member 50*a* of stop lever 50 is engaged with base 12 by second fastener 50*f*, the shaft 50*e'* of first fastener 50*e* is seated within notch 12*p'*. Leaf spring 52 urges or biases shaft 50*e'* into notch 12*p'* and thereby urges or biases plate member 50*a* into engagement with scale 44.

Figure 6:
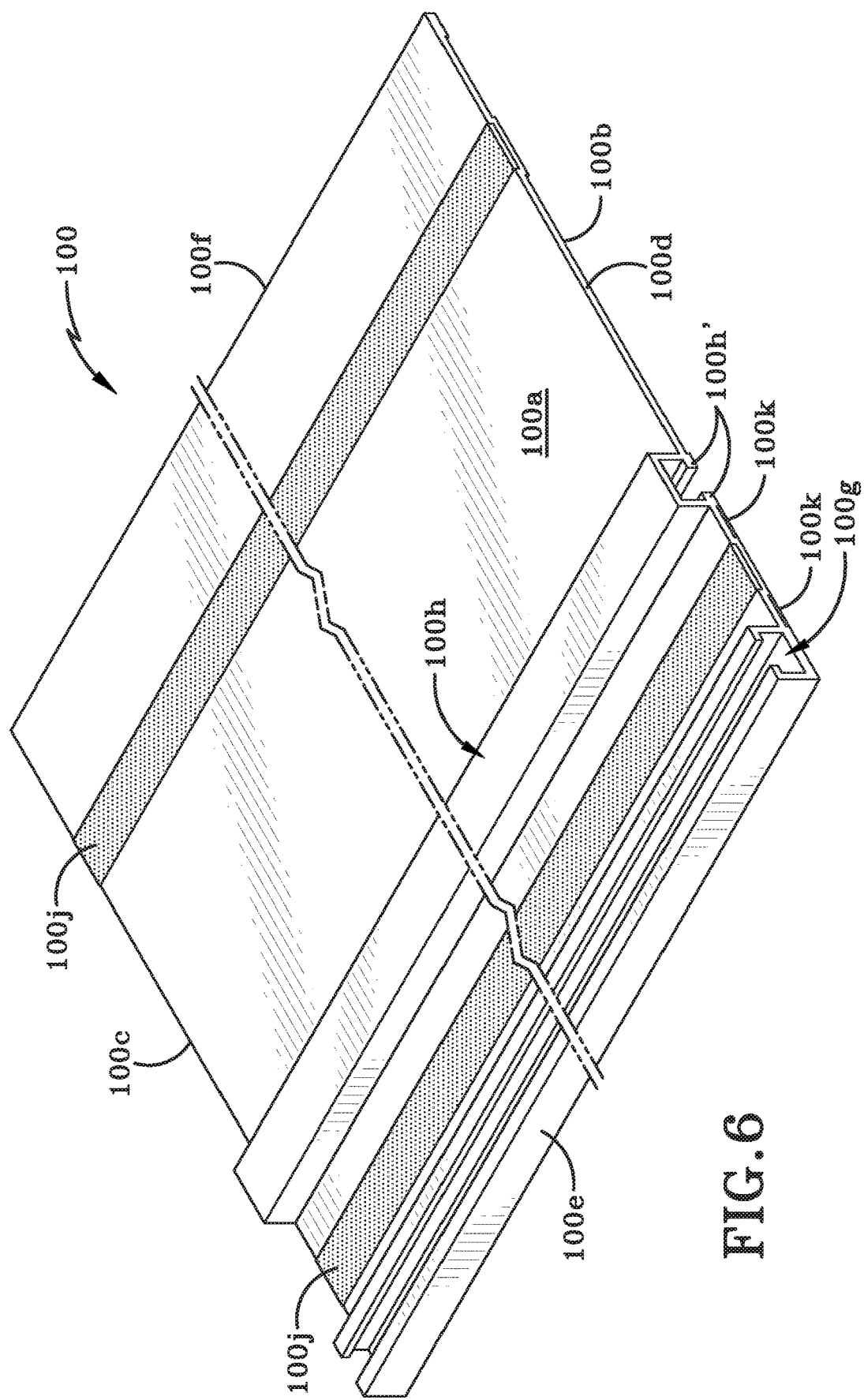
FIG. 6 is a partial top, front, left side perspective view of a guide rail with which the adjustable track square is selectively engageable.
Figure 7:
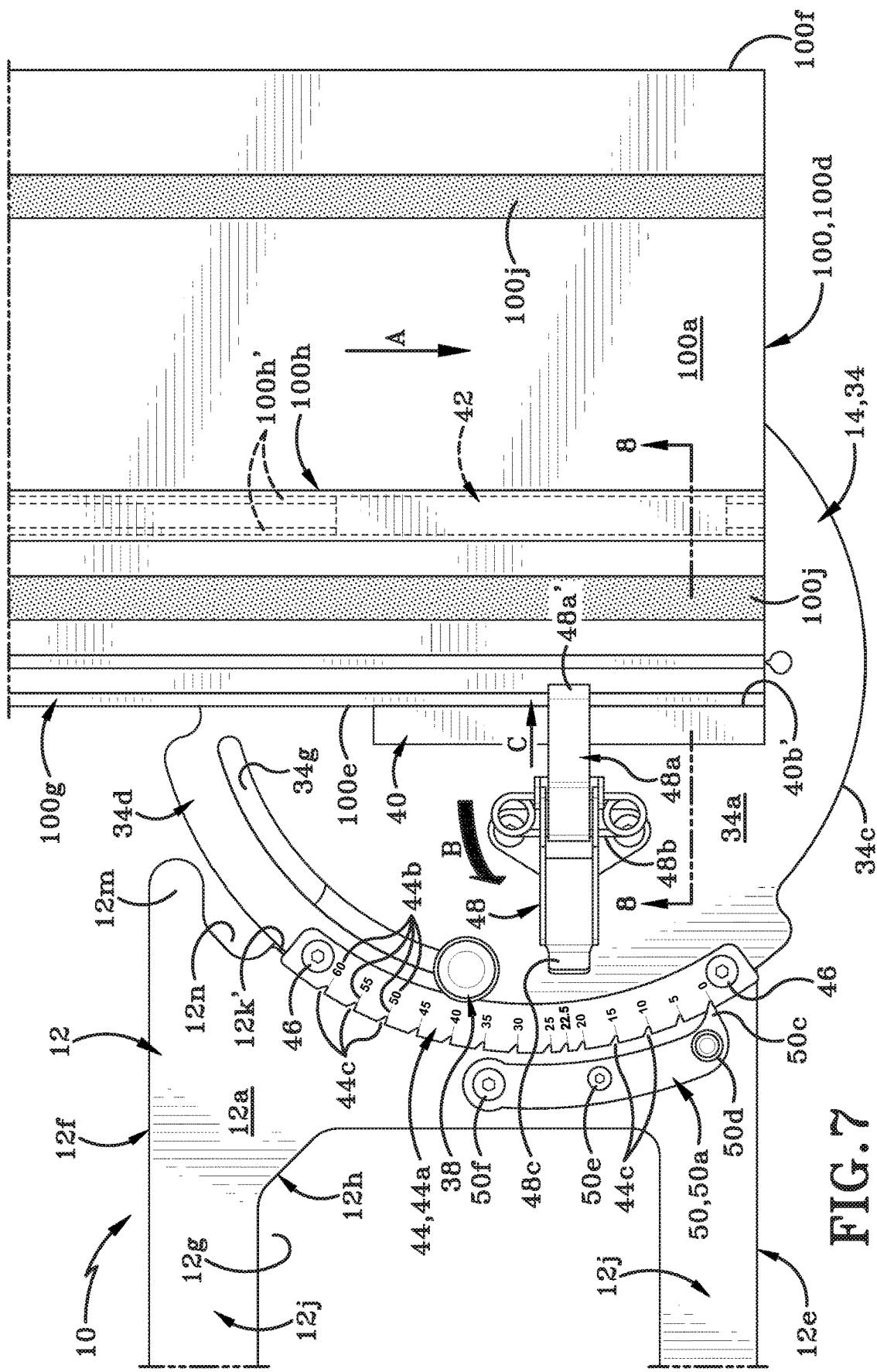
FIG. 7 is a top plan view showing the adjustable track square of FIG. 1 engaged with the guide rail of FIG. 5.

The use of adjustable track square 10 will now be described. In FIGS. 6, 7 and 8, a standard guide rail 100 that is used in conjunction with a track saw (not shown) or plunge saw is illustrated. Guide rail 100 is a component that is typically sold in conjunction with the track saw and is not part of the track square 10 but is used in conjunction therewith.

Guide rail 100 is an elongate, linear component that has an upper surface 100*a*, a lower surface 100*b*, a first end 100*c*, a second end 100*d*, a first side 100*e*, and a second side 100*f*. Upper and lower surfaces 100*a*, 100*b* define a vertical direction therebetween; first and second ends 100*c*, 100*d* define a longitudinal direction therebetween; and first and second sides 100*e*, 100*f* define a lateral direction therebetween.

First and second channels 100*g*, 100*h* are molded into the body of guide rail 100. Each of the first and second channels 100*g*, 100*h* extend longitudinally from first end 100*c* to second end 100*d* of guide rail 100. First channel 100*g* is accessible through an opening defined in upper surface 100*a* and second channel 100*h* is accessible through an opening defined in lower surface 100*b*. First and second channels 100*g*, 100*h* are spaced a distance laterally apart from each other that is slightly less than the lateral distance between first guide bar 40 and second guide bar 42. This is seen in FIG. 8. At least a portion of second channel 100*h* is complementary in cross-sectional shape to second guide bar 42. When guide rail 100 and track square 10 are engaged with each other, as will be described hereafter, first side 100*e* of guide rail 100 abuts a side 40*b'* of horizontal second leg 40*b* of first guide bar 40 and second guide bar 42 is received in second channel 100*h* of guide rail 100.

Guide rail 100 includes one or more anti-friction or low-friction strips 100*j* provided on upper surface 100*a* that help to ensure a track saw is able to slide longitudinally along the upper surface 100*a* of guide rail 100 when the track saw is engaged with guide rail 100. Guide rail 100 further includes one or more high-friction strips 100*k* on lower surface 100*b* that aid in helping guide rail 100 to not slip upon a surface upon which guide rail 100 is rested for use. Each of the low-friction strips 100*j* extends longitudinally along the upper surface 100*a* of guide rail 100. Each of the high-friction strips 100*k* preferably also extends longitudinally along the lower surface 100*b* of guide rail 100. It will be understood that other configurations of low-friction strips 100*j* and/or high-friction strips 100*k* may be utilized instead of what is shown in the attached figures.

In order to engage the track square 10 with guide rail 100, the second end 100*d* of guide rail 100 is positioned adjacent the front 12*f* of track square 10. Guide rail 100 is therefore at right angles to the longitudinal direction of the track square 10. Guide rail 100 is positioned such that first side 100*e* of guide rail is positioned in abutting contact with side 40*b'* of first guide bar 40 and second channel 100*h* is aligned with second guide bar 42. Guide rail 100 is then slid onto second guide bar 42 in the direction indicated by arrow "A" (FIG. 7) keeping first side 100*e* in contact with side 40*b'*. When second guide bar 42 is received within channel 100*h*, the shoulders 100*h'* (FIG. 8) of guide rail 100 are received within the grooves 42*c* defined by second guide bar 42. In this way, guide rail 100 and second guide bar 42 interlockingly engage each other.

Once at least a portion of guide rail 100 is moved toward draw latch 48, the user will pivot draw latch 48 out of the way of guide rail 100 in the direction indicated by arrow "B" (FIG. 7). The user will continue to slide guide rail 100 along second guide bar 42 in the direction of arrow "A" and once at least a portion of guide rail 100 has moved past draw latch 48, draw latch 48 is pivoted in the opposite direction to arrow "B" and so that the hooked end 48*a'* thereof will enter into the upwardly facing channel 100*g* of guide rail 100 as indicated by the arrow "C" (FIG. 7). Tab 48*c* of draw latch 48 will then be pushed away from first guide bar 40 and toward scale 44. Additionally, tab 48*c* will be pushed downwardly toward upper surface 34*a*. Hooked end 48*a'* will thereby become locked into place within first channel 100*g* and track square 10 and guide rail 100 will be fixedly secured to each other. At this point, guide rail 100 and track square 10 are interlockingly engaged with each other and will move as a unit.

FIGS. 7 and 7A show stop lever 50 in a position that ensures that a right angled cut will be made by a track saw that is engaged with guide rail 100. In particular, the hook 50*c* of stop lever 50 is engaged in the V-shaped notice 44*c* that is associated with the "0°" marking 44*b* of scale 44. Additionally, scale 44 is locked in position such that turntable 14 is not able to rotate relative to base 12. This locking is accomplished by ensuring that the locking knob 38 is rotated in a direction that will prevent rotation motion of turntable 14 relative to base 12. If, the hook 50*c* of stop lever 50 was originally engaged in a notch 44*c* associated with another marking 44*b* on scale 44, e.g. 15°, then the user will rotate locking knob 38 in a direction that will ensure that it no longer clampingly engages turntable 14 to base 12. Grasping knob 50*d*, the user will pivot stop lever 50 out of engagement with scale 44 and will rotate turntable 14 in a direction that moves the "0°" marking 44*b* into general alignment with the hook 50*c* of stop lever 50. The user will release knob 50*d* and stop lever 50 will move back into engagement with scale 44 under influence of leaf spring 52. In particular, hook 50*c* will reengage in the appropriate V-shaped notch 44*c* defined in scale 44. Once hook 50*c* is engaged in the appropriate notch 44*c* associated with the "0°" marking 44*b*, the user will rotate locking knob 38 in the opposite direction to once again clampingly secure turntable against rotational movement relative to base 12.

Referring to FIG. 7A, track square 10 and guide rail 100 are positioned adjacent a piece of wood 200 to be cut with a track saw that is slidable along guide rail 100. Only a portion of wood 200 is illustrated in this figure. Wood 200 includes an upper surface 200*a*, a lower surface 200*b*, and an edge 200*c*. The user will move track square 10 with the guide rail 100 engaged therewith in a direction indicated by arrow "D" towards edge 200*c* of wood 200. In particular, the user will position front 12*f* of base 12 of track square 10 in abutting contact with edge 200*c* of wood 200. Support tab 16 will rest upon upper surface 200 of the wood 200 and the guide rail 100 is able to be lifted upwardly at an end remote from track square 10 and placed onto upper surface 200*a* of wood 200. Support tab 16 helps to ensure that the base 12 of track square 10 is held substantially parallel to the upper surface 200*a* of wood 200. Track square 10 and guide rail 100 may be moved in either direction as indicated by arrow "E" to cause the second side edge 100f of guide rail 100 to align with one or markings 200d made on upper surface 200a of wood 200. (The one or more markings 200d are made by measuring how far inwardly from one of the ends of the wood 200 the cut should be made and then drawing a pencil line, for example, on upper surface 200a.) High-friction strips 100k on the lower surface 100b of guide rail 100 prevent lateral sliding motion of the guide rail 100 along upper surface 200a of wood 200 so the guide rail 100 may have to be held upwardly out of contact with upper surface 200a of wood 200 while moving track square 10 in either direction indicated by arrow "E". When the second side edge 100f is more or less aligned with markings 200d, the guide rail 100 may be lowered towards upper surface 200a to more accurately align second side edge 100f thereof with markings 200d. Once track square 10 and guide rail 100 are positioned where the user wants them on the wood 200, the track saw may the engaged with the guide rail 100 (as is well known in the art). The track saw may then be actuated and moved along the guide rail 100 in a direction moving across the wood and away from edge 200a. The rotating blade of the track saw will cut the wood 200 adjacent the second side edge 100f of the guide rail 100. The cut so formed will be at whatever angle the second side edge 100f of the guide rail 100 is retained by track square 10. This will be described further below.

Figure 7B:
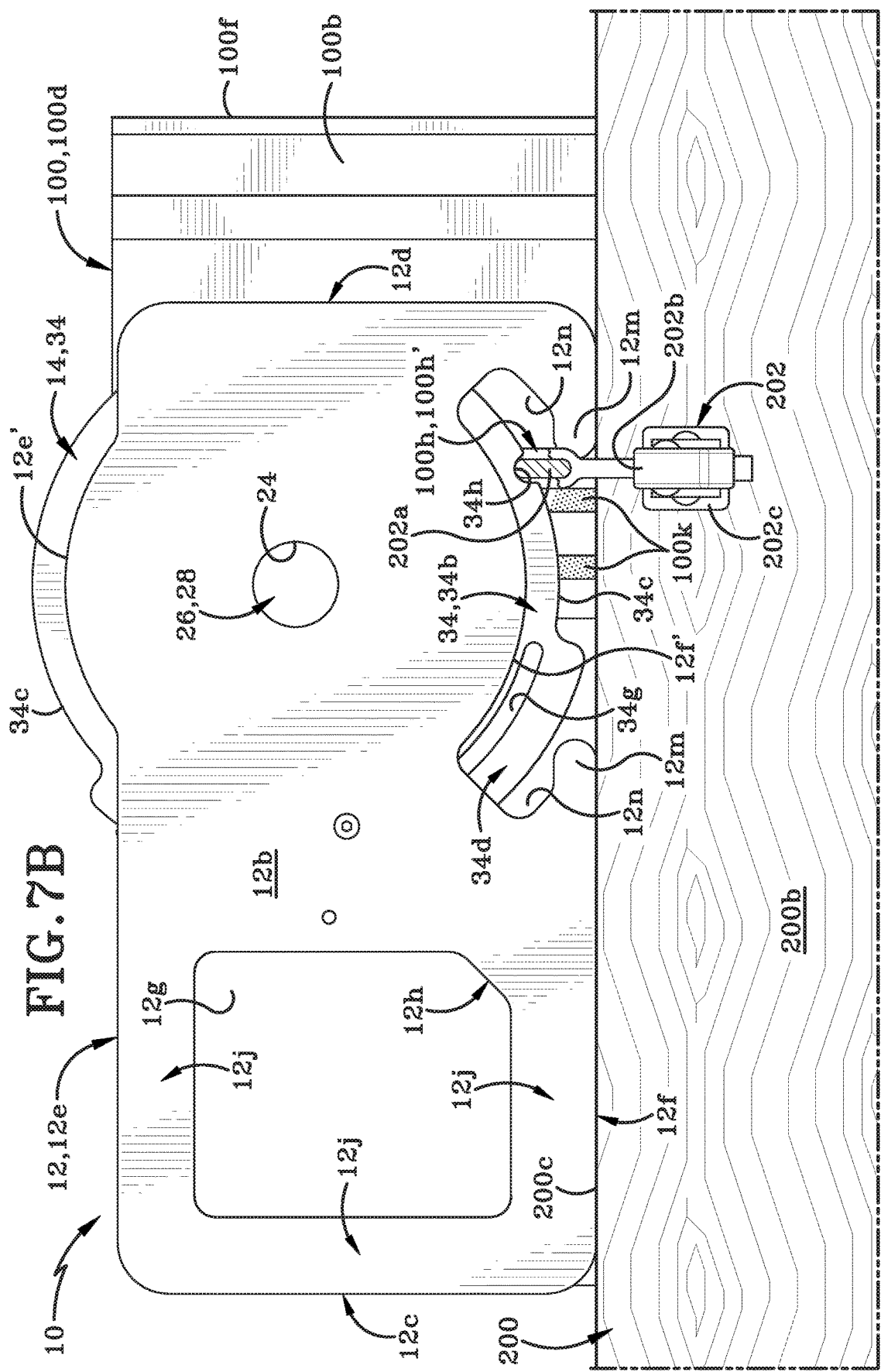
FIG. 7B is a bottom plan view of the track square, guide rail and wood of FIG. 7A and further showing a guide rail clamp engaged with the track square, the guide rail, and the wood.

FIG. 7B shows that a guide rail clamp 202 may optionally be utilized to secure guide rail 100 to the piece of wood 200. This practice is commonly known in the art. In particular, it is known in the art to engage an arm of a guide rail clamp in a channel defined in the underside of a guide rail in order to secure a guide rail to a piece of wood to be cut. Guide rail clamp 202 is only shown from below but typically will include an L-shaped arm 202a, a body 202b, and a clamping pad 202c. The clamping pad 202c may be provided at an upper end of the body 202b and the body 202b is able to slide upwardly and downwardly a vertically-oriented leg of the L-shaped arm 202a. The horizontal leg of the arm 202a is slid into the channel 100h (FIG. 6) defined in lower surface 100b of guide rail 100. Body 202b and clamping pad 202c are moved upwardly toward lower surface 200b of wood 200 and until clamping pad 202c abuts lower surface 200b. A latching handle on the body 202b is then actuated to clampingly engage guide rail 100 to wood 200. In accordance with an aspect of the present disclosure, a portion of the vertical leg of arm 202a is received in notch 34h of turntable 14 of track square 10, thus engaging guide rail 100, track square 10, and wood 200 to each other.

Figure 9:
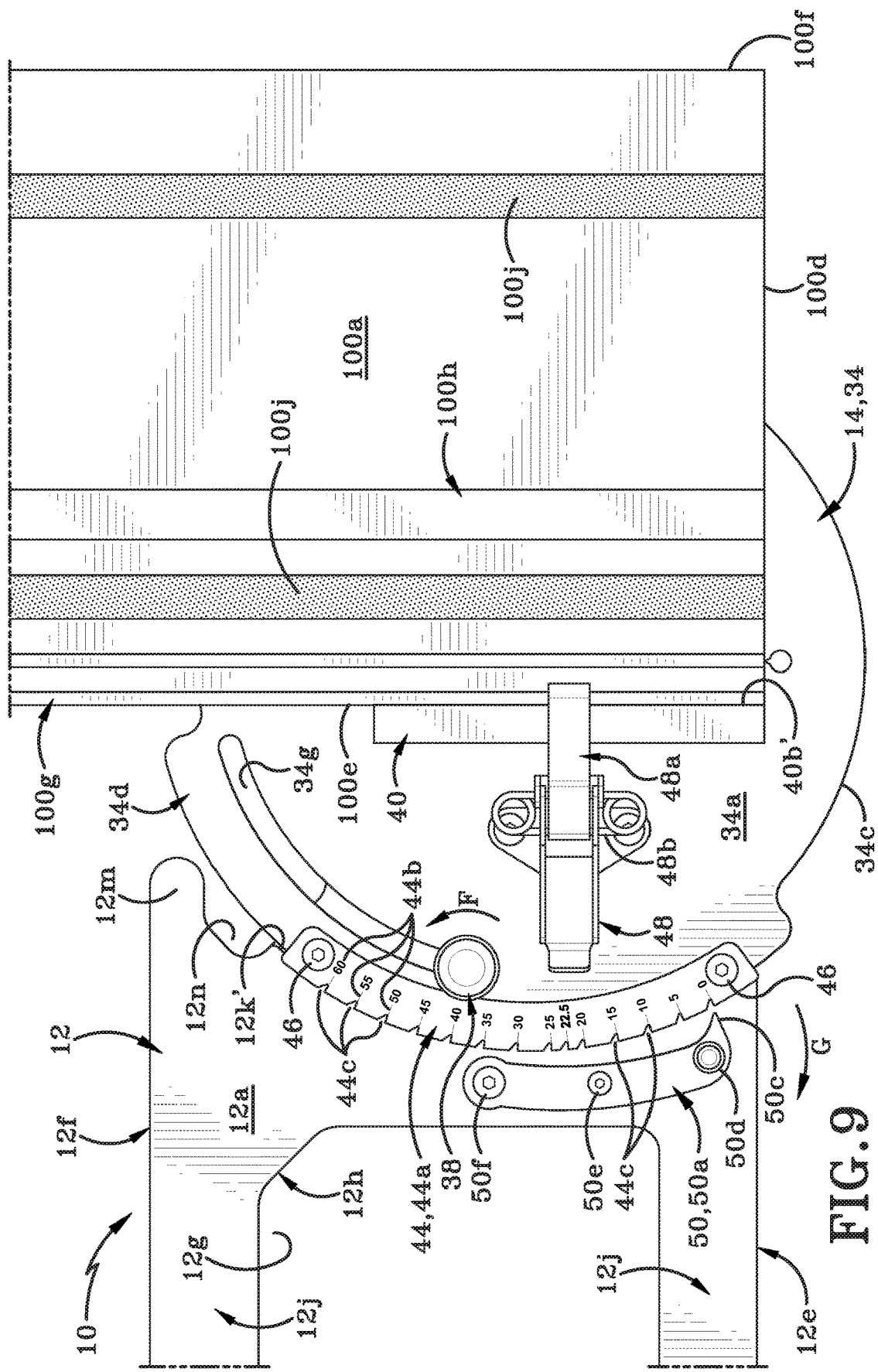
FIG. 9 is a top plan view of the adjustable track square and guide rail showing the stop lever being moved out of engagement with the scale in order to adjust the adjustable track square.

FIGS. 9-12 show the adjustable track square 10 may be adjusted to change the angle at which a track saw moving along guide rail 100 will cut a piece of wood 200. FIG. 9 shows a first step where the locking knob 38 is loosened in the direction indicated by arrow "F". When locking knob 38 is rotated in the direction "F", the clamping engagement of locking knob 38 is halted. Turntable 14 is then capable of rotating relative to base 12. The user will grasp knob 50d on stop lever 50 and will move hook 50c of stop lever 50 in the direction "G" and out of engagement with scale 44.

Figure 10:
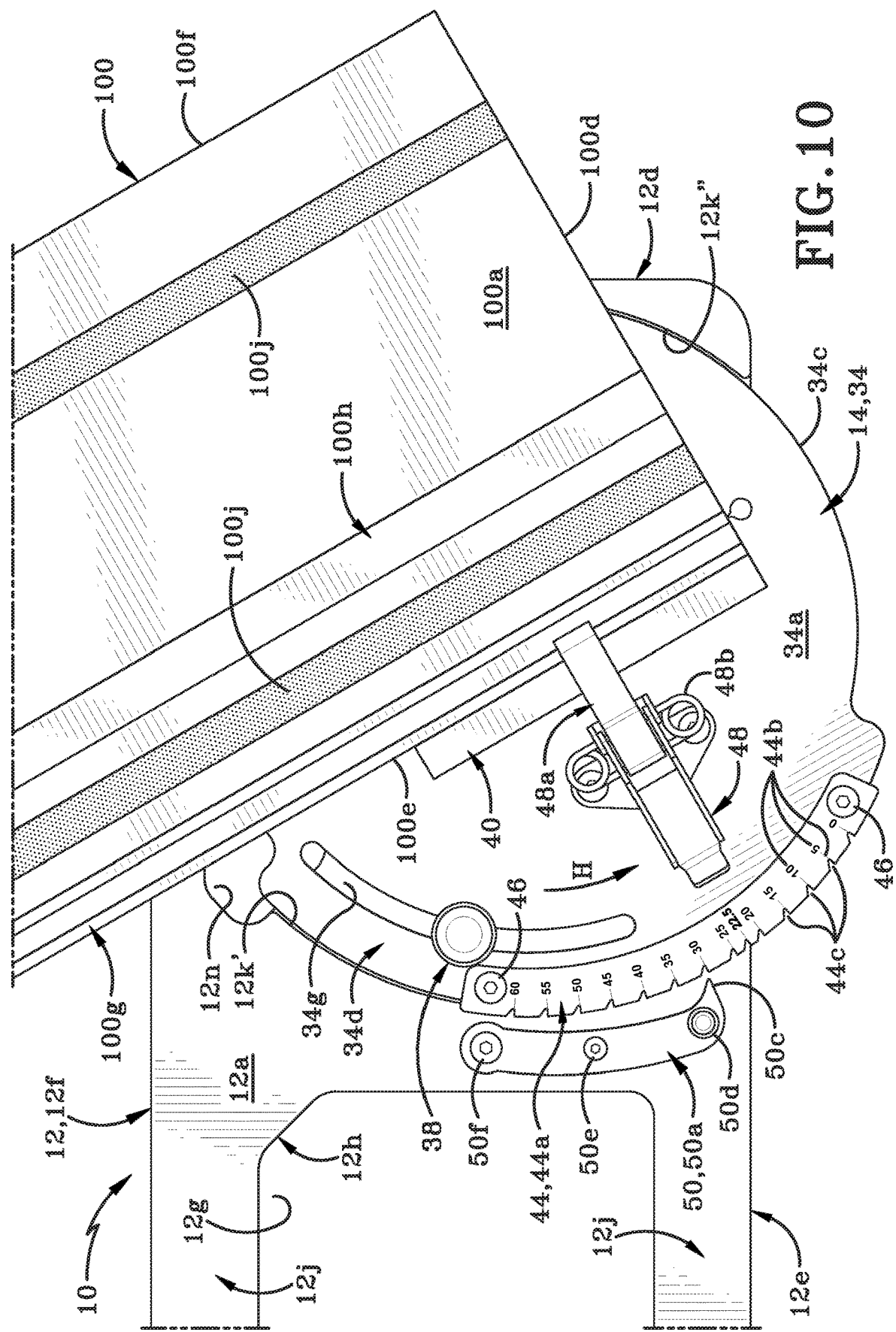
FIG. 10 is a top plan view of the adjustable track square and guide rail showing the turntable rotated relative to the base to change the angle of the guide rail.
Figure 11:
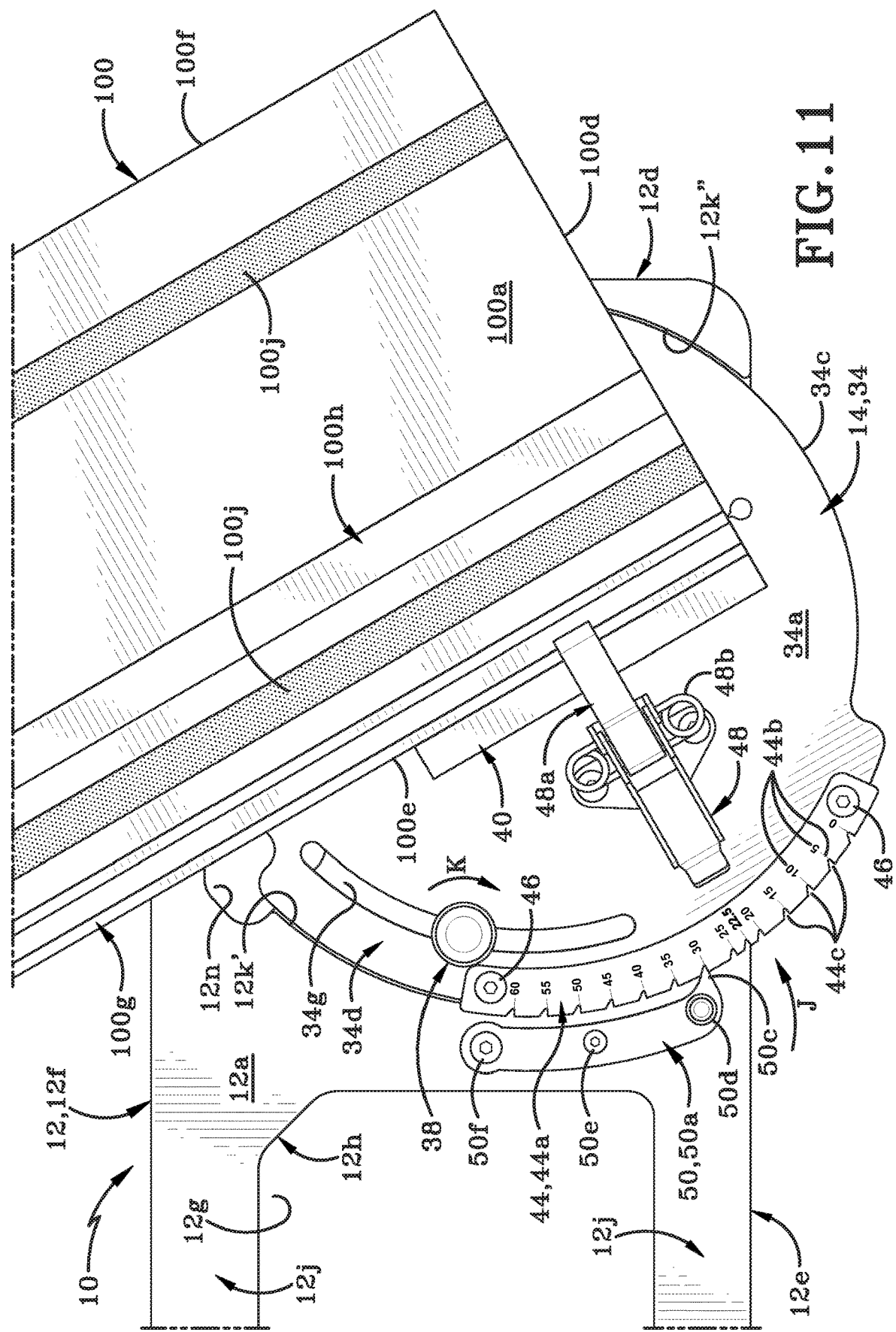
FIG. 11 is a top plan view of the adjustable track square and guide rail showing the stop lever engaged with the scale and locking the adjustable track square and a desired angle.
Figure 12:
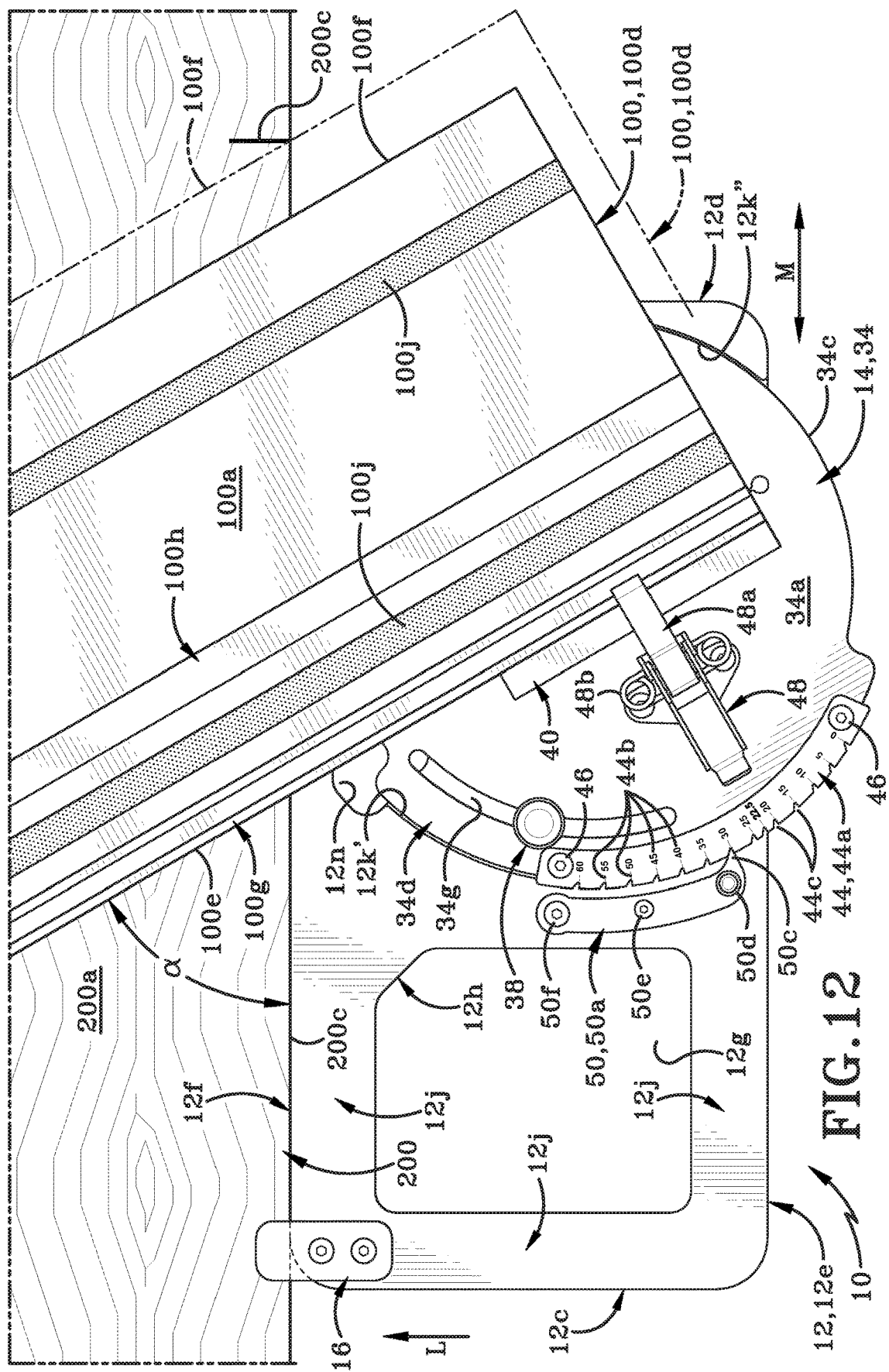
FIG. 12 is a top plan view of the adjustable track square and engaged guide rail placed on a piece of wood to be cut.

FIG. 10 shows the turntable 14 being rotated in the direction of arrow "H" while the stop lever 50 is held a distance away from scale 44. When hook 50c on stop lever 50 is aligned with the desired angle marking 44b on scale 44, stop lever 50 is released and it moves back into engagement with the notch 44c associated with the selected marking 44b. This movement is indicated by the arrow "J" in FIG. 11. Locking knob 38 is then rotated in the direction "K" (opposite direction to the rotation "F" shown in FIG. 9). This rotation of locking knob 38 causes turntable 14 to be clamped once again against movement relative to base 12.

The user will then move track square 10 in the direction indicated by arrow "L" (FIG. 12) towards edge 200c of wood 200. In particular, the user will move track square's front 12f into abutting contact with edge 200c of wood 200. Support tab 16 will be placed on upper surface 200a of wood 200 and guide rail 100 will also be placed on upper surface 200a of wood 200 as previously described herein. As is evident from FIG. 12, track square 10 holds guide rail 100 at an angle α relative to edge 200c of wood 200. The angle α corresponds to the angle marking 44b and associated notch 44c on scale 44 of track square 10 with which the hook 50c of stop lever 50 is engaged.

Track square 10 may then be moved in either direction indicated by arrows "M" along edge 200c of wood 200 to bring the edge 100e of guide rail 100 into alignment with the marking 200d on upper surface 200a of wood 200. Keeping the track square 10 in the position shown in FIG. 12, the user will move the track saw along guide rail 100 and the rotating blade of the track saw will cut the wood at the angle set on scale 44. Again, the rotating blade of the track saw will make a cut adjacent the second side edge 100f of the guide rail 100.

Changing the angle α of the guide rail 100 relative to the edge 200c of wood 200 is easily accomplished by simply loosening locking knob 38, pivoting stop lever 50 out of engagement with scale 44, rotating turntable 14 until the desired angle marking 44b on scale 44 aligns with the hook 50c of stop lever 50, releasing the stop lever 50 so that it reengages with scale 44 and retightening locking knob 38. Because guide rail 100 is interlockingly engaged with turntable 14, rotation of turntable 14 causes a substantially identical rotation in the position of guide rail 100.

It should be noted that it is possible to set the angle of guide rail 100 at an angle that is intermediate the angles indicated by the hook 50c engaging in notches 44c. For example, it is possible to set the angle α at 7.5° by simply positioning the tip of hook 50c on stop lever 50 on the edge of scale 44 equidistantly between the angle marking of 5° and the angle marking of 10° and then rotating locking knob 38 to lock the turntable 14 against rotation.

It is possible to duplicate an angle on two pieces of wood using track square 10. Using the track square 10 and guide rail 100, the user will align two edges of cut wood pieces to be duplicated to the track square 10 and guide rail 100. The locking knob 38 can be tightened to lock the track square 10 and thereby the guide rail 100 at a desired angle α. The locked track square 10 and guide rail 100 can then be aligned with the second piece of wood and exactly the same angle cut can be made in second piece of wood using a track saw that moves along guide rail 100.

In summary, a method of cutting a piece of wood 200 in accordance with the present disclosure comprises engaging a track square 10 with a guide rail 100 of a track saw (not shown); selecting an angle α (FIGS. 7A and 12) at which to orient the guide rail 100 relative to the front 12f of track square 10; moving the guide rail into the selected angle orientation by rotating turntable 14 in the direction indicated by "F" or in the opposite direction to arrow "F", i.e., arrow "K"; moving the track square 10 towards edge 200c in the direction indicated by arrow "D" (FIG. 7A) or "L" (FIG. 12), placing a front 12f of the track square 10 in contact with the vertically-oriented, edge 200c of a piece of wood 200 to be cut with the track saw; placing a lower surface 100b of the guide rail 100 in contact with an upper surface 200a of the piece of wood 200; moving the track saw (not shown but known in the art) along the guide rail 100; and cutting the wood 200 with the track saw at the selected angle α. The engaging of the track square 10 with the guide rail 100 includes inserting a guide bar 42 on the rotatable turntable 14 of the track square into a channel 100h defined in a lower surface 100b of the guide rail 100. The engaging of the track square 10 with the guide rail 100 includes engaging a draw latch 48 provided on the rotatable turntable 14 of the track square 10 into a channel 100g defined in an upper surface 100a of the guide rail 100.

In the performance of the method in accordance with the present disclosure, the selecting of the angle α at which to orient the guide rail 100 includes rotating a turntable 14 on the track square 10 with which the guide rail 100 is engaged relative to a base 12 of the track square 10. The selecting of the angle α at which to orient the guide rail includes aligning a stop lever 50 on one of a base 12 and rotatable turntable 14 of the track square 10 with a selected marking 44b/44c on a scale 44 provided on the other of the base 12 and the rotatable turntable 14. The method may further comprise engaging a locking mechanism 38 after selection of the angle α, and preventing rotation of the turntable 14 relative to the base 12.

The method in accordance with the present disclosure further comprises placing a support tab 16 extending outwardly from a base 12 of the track square 10 on an upper surface 200a of the piece of wood 200 to be cut. The method further comprises engaging a portion 202a of a guide rail clamp 202 with the track square 10. The engaging of the portion 202a of the guide rail clamp 202 includes positioning the portion 202a of the guide rail clamp 202 in a notch 34h defined in a rotatable turntable 14 of the track square 10.

It will be understood that while scale 44 has been disclosed as being provided on turntable 14 and stop lever 50 has been disclosed as being provided on base 12, in other embodiments, the scale may be provided on the base and the stop lever may be provided on the turntable.

It will be understood that while turntable 14 has been disclosed as including a first guide bar 40 and a second guide bar 42 thereon, other embodiments may utilize only the second guide bar 42 which interlocks within a channel provided on guide rail.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clarity, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. An adjustable track square comprising:
   a base having a front adapted to abut an edge of a piece of wood to be cut;
   a recessed region defined in an upper surface of the base;
   a hub assembly operably engaged with the base within the recessed region thereof;
   a turntable within the recessed region of the base and rotatable relative to the base about the hub assembly, said turntable having an upper surface adapted to receive a guide rail for a track saw thereon, wherein the turntable includes a circumferential edge and a notch is defined in the circumferential edge, said notch being adapted to receive an arm of a guide rail clamp therein;

at least one guide bar provided on the upper surface of the turntable, wherein the at least one guide bar is adapted to engage the guide rail when received on the upper surface of the turntable;

a latch mechanism provided on the turntable, said latch mechanism being adapted to interlockingly engage the guide rail of the track saw and to retain the guide rail in abutting contact with the upper surface of the turntable; and wherein the turntable is configured to selectively rotate relative to the base and present the guide rail at an angle relative to the front of the base and thereby to the edge of the piece of wood;

an angle selection mechanism provided on one or both of the base and the turntable, said angle selection mechanism being operable to set a rotational position of the turntable relative to the base, wherein the angle selection mechanism comprises:

a scale provided with a plurality of graduated markings thereon; and a stop lever that selectively engages the scale at a selected one of the plurality of graduated markings.

2. The adjustable track square according to claim 1, wherein the turntable is selectively rotatably through from about 30° up to about 90° relative to the front of the base to present the guide rail at an angle of from about 30° up to about 90° relative to the edge of the piece of wood.

3. The adjustable track square according to claim 1, wherein the latch mechanism includes a draw latch mounted on the turntable, said draw latch being selectively interlockable with the guide rail.

4. The adjustable track square according to claim 1, wherein the at least one guide bar includes a first guide bar provided on the turntable, said first guide bar being adapted to selectively interlock with a channel provided on the guide rail.

5. The adjustable track square according to claim 1, wherein the stop lever is selectively pivotable and is biased into engagement with the scale.

6. The adjustable track square according to claim 1, further comprising a locking mechanism, said locking mechanism being movable between a locked condition and an unlocked condition, and when the locking mechanism is in the locked condition, the turntable is not able to rotate relative to the base; and when the locking mechanism is in the unlocked condition, the turntable is able to rotate relative to the base.

7. The adjustable track square according to claim 1, further comprising a support tab extending outwardly from an upper surface of the base a distance away from the turntable, said support tab extending outwardly beyond the front the base and being adapted to rest upon an upper surface of the piece of wood to be cut.

8. The adjustable track square according to claim 1 wherein the upper surface of the base and the upper surface of the turntable are substantially co-planar when the turntable is within the recessed region.

9. In combination:
a track saw having a rotatable saw blade;
a guide rail configured to interlockingly engage the track saw, wherein said track saw is movable along the guide rail and is operable to perform a cut with the rotatable saw blade adjacent a side edge of the guide rail; and
an adjustable track square, wherein the adjustable track square comprises:
a base having a front edge adapted to abut an edge of a sheet of wood to be cut;
a recessed region defined in an upper surface of the base;
a hub assembly operably engaged with the base within the recessed region thereof;
a turntable within the recessed region of the base and rotatable relative to the base about the hub assembly, said turntable having an upper surface, wherein the guide rail is received on the upper surface of the turntable and is adapted to extend beyond an outer perimeter of the turntable and onto the sheet of wood, wherein the turntable includes a circumferential edge and a notch is defined in the circumferential edge, said notch being adapted to receive an arm of a guide rail clamp therein;
at least one guide bar provided on the upper surface of the turntable, wherein the at least one guide bar engages the guide rail when received on the upper surface of the turntable;
a latch mechanism releasably engaging the guide rail and retaining the guide rail in abutting contact with the upper surface of the turntable; and
an angle selection mechanism provided on one or both of the base and the turntable, said angle selection mechanism being operable to set a rotational position of the turntable relative to the base, wherein the angle selection mechanism comprises:
a scale provided with a plurality of graduated markings thereon; and
stop lever that selectively engages the scale at a selected one of the plurality of graduated markings;
wherein the turntable is configured to selectively rotate relative to the base and present the guide rail at an angle relative to the front of the base and thereby to the edge of the sheet of wood.

10. The combination according to claim 9, wherein an upper surface of the guide rail defines a channel therein, and wherein the latch mechanism includes a spring-loaded arm that extends beyond the at least one guide bar, and wherein the spring-loaded arm has a free end that is interlockingly receivable in the channel of the guide rail.

11. The adjustable track square according to claim 9 wherein the upper surface of the base and the upper surface of the turntable are substantially co-planar when the turntable is within the recessed region.

* * * * *